US006594878B2

(12) United States Patent
Kohda

(10) Patent No.: US 6,594,878 B2
(45) Date of Patent: Jul. 22, 2003

(54) SCATTERED RAY REMOVAL GRID AND METHOD OF PRODUCING THE SAME

(75) Inventor: Katsuhiro Kohda, Kaisei (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,282

(22) Filed: Jan. 27, 2000

(65) Prior Publication Data

US 2003/0035512 A1 Feb. 20, 2003

(30) Foreign Application Priority Data

Jan. 27, 1999 (JP) .......................................... 11-018562

(51) Int. Cl.[7] ................................................ B23P 17/00

(52) U.S. Cl. ........................ 29/417; 29/527.1; 156/264; 156/224; 378/154; 72/342.7

(58) Field of Search ............................... 29/527.1, 412, 29/417; 72/342.7, 342.8, 342.92; 378/154, 155, 145; 156/264, 222, 224

(56) References Cited

U.S. PATENT DOCUMENTS 1,476,048 A * 12/1923 Bucky ........................ 378/154
2,133,385 A * 10/1938 Freeman ..................... 378/154
2,760,077 A * 8/1956 Longini ....................... 378/154
3,621,700 A * 11/1971 Wachtell ..................... 72/342.8
5,252,160 A * 10/1993 Scanlon et al. ............. 156/224
5,291,539 A * 3/1994 Thumann et al. ........... 378/154
5,418,833 A * 5/1995 Logan ........................ 378/154
5,581,592 A * 12/1996 Zarnoch et al. ............. 378/154
6,055,296 A * 4/2000 Ferlic et al. ................ 378/154

FOREIGN PATENT DOCUMENTS

JP 59047038 A * 3/1984 ................ 72/342.7
JP 2-263279 10/1990 ........... G06F/15/70
JP 05023744 A * 2/1993 .............. 72/342.92

* cited by examiner

*Primary Examiner*—Gregory Vidovich
*Assistant Examiner*—Jermie E. Cozart
(74) *Attorney, Agent, or Firm*—Sughrue Mion, PLLC

(57) ABSTRACT

A scattered ray removal grid that has an overall shape of constant spherical curvature. The scattered ray removal grid has radiation absorbing portions arrayed in a lattice configuration and radiation non-absorbing portions made of thermoplastic resin disposed between the radiation absorbing portions and can therefore be easily produced to have an overall spherical shape at low cost.

1 Claim, 6 Drawing Sheets

SCATTERED RAY REMOVAL GRID AND METHOD OF PRODUCING THE SAME

BACKGROUND OF THE INVENTION

1. Field of the Invention

The present invention relates to a scattered ray removal grid used in a radiographic device and a method of producing the grid, particularly to a scattered ray removal grid formed to have spherical curvature.

2. Description of the Related Art

Scattered ray removal grids have been developed for use in X-ray imaging devices. Japanese Unexamined Patent Publication No. 2(1990)-263279, for example, teaches the scattered ray removal grid 100 shown in FIG. 6. The scattered ray removal grid 100 is composed of radiation absorbers 102 and radiation non-absorbers 104 aligned alternately in a plate-like configuration. Of the rays, e.g., X-rays 108, emitted from a radiation source 113 and passing through a subject 106 (the transmitted rays) some are scattered in oblique directions by the subject 106 and become scattered rays 109 and others continue along substantially straight paths and become main transmitted X-rays 110. The scattered ray removal grid 100 absorbs and removes the scattered rays 109 and efficiently passes only the main transmitted X-rays 110. This reduces the amount of image noise caused by scattered rays. The radiation absorbers 102 of the scattered ray removal grid 100 are directed toward the radiation source (X-ray source) 111 and given tilt angles that increase with increasing proximity to the edges of the grid. This aligns them with advancing direction of the main transmitted X-rays 110 that pass through the subject 106 without scattering and therefore prevents decrease of the transmittance at the peripheral region.

The scattered ray removal grid 100 is, however, expensive to produce owing to the large number of fabrication steps made necessary by the need to vary the shape of the individual radiation non-absorbers 104 (formed of wood, aluminum or the like) in correspondence to the changing angle of the radiation absorbers 102 between which they fit.

SUMMARY OF THE INVENTION

The present invention was accomplished in light of the foregoing circumstances and has as an object to provide a scattered ray removal grid that is easy and inexpensive to produce. Another object of the present invention is to provide a method of producing the scattered ray removal grid.

The scattered ray removal grid according to the present invention is characterized in being formed in an overall shape of constant spherical curvature.

The method of producing a scattered ray removal grid according to the present invention comprises the steps of placing a plate-like grid having thermoplastic resin interposed between its grid elements between a set of dies having surfaces of complementary spherical curvature of prescribed radii, causing the set of dies to form the grid into a shape having spherical curvature of a prescribed radius by pressing and heating the grid to its softening temperature, and cooling the grid formed in a spherical shape.

The grid can be one whose radiation absorbers are arrayed in parallel or one whose radiation absorbers are arrayed in a lattice.

The method of producing a scattered ray removal grid according to the present invention heats a plate-like grid temperature that is composed of spaced grid elements made form a radiation-absorbing material and thermoplastic resin interposed between the grid elements, forms the grid into overall spherical shape, and then cools it. This method does not require the individual grid portions to be separately formed and can therefore produce the scattered ray removal grid with utmost ease and efficiency. The so-obtained scattered ray removal grid can therefore be produced with ease at low cost. It is therefore affordable enough to obtain in numbers for alignment in the advancing direction of the emitted X-rays at different distances from the X-ray source. Its low cost thus further expands its range of application. The X-ray sensor unit disposed behind the scattered ray removal grid is preferably given an approximately spherical curvature following that of the spherical scattered ray removal grid so as to prevent image distortion by ensuring that the transmitted rays enter the sensor substantially perpendicularly.

DESCRIPTION OF THE PREFERRED EMBODIMENT

Figure 1A:
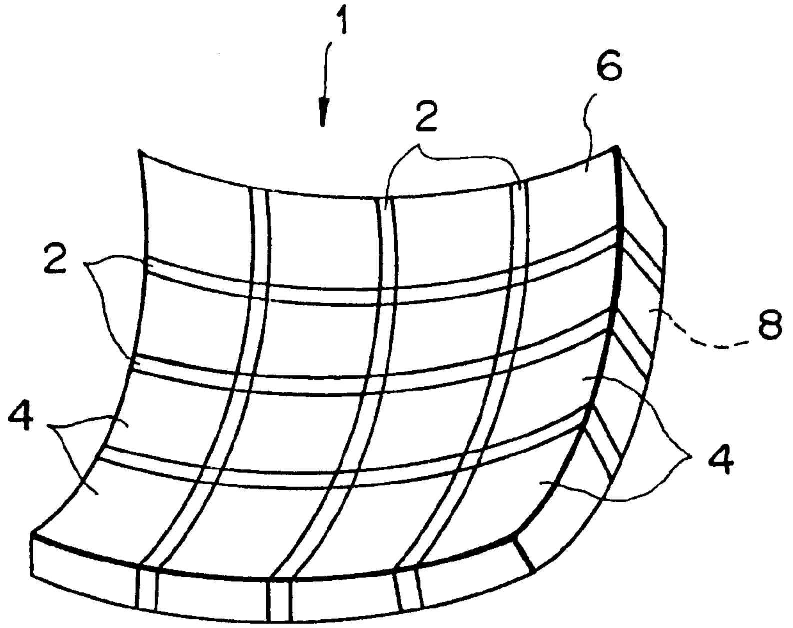
FIG. 1A is a perspective view showing a scattered ray removal grid that is an embodiment of the present invention.
Figure 1B:
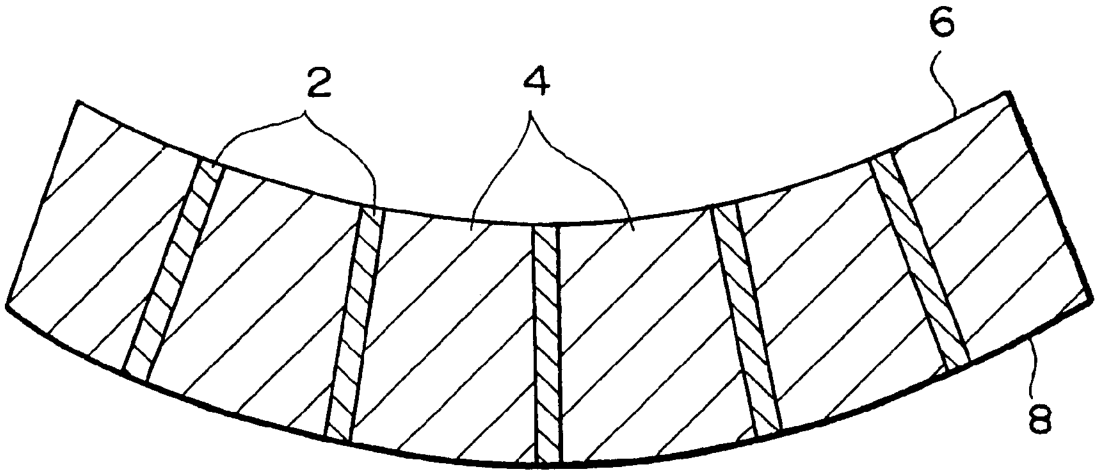
FIG. 1B is a side view of the scattered ray removal grid shown in FIG. 1A.

A preferred embodiment of the present invention will now be explained in detail with reference to the accompanying drawings. FIG. 1A is a perspective view showing a scattered ray removal grid that is an embodiment of the present invention, and FIG. 1B is a side view of the same.

As shown in these figures, a scattered ray removal grid 1 includes multiple scattered ray absorbers (grid elements) 2 made of radiation-absorbing material and arrayed in the form of a lattice. Spacers 4 made of a thermoplastic material that is radiation non-absorbent are disposed at the portions enclosed by or in contact with the lattice. The scattered ray removal grid 1 is formed to have overall spherical curvature. Alternatively, the scattered ray absorbers 2 can be arrayed in parallel rather than in the shape of a lattice as in this embodiment. The radiation-absorbing (scattered ray-absorbing) material used for the scattered ray absorbers 2 can be a simple substance such as lead foil, bismuth or the like, a powder of a simple substance, a lead compound, a bismuth compound, or film obtained by coating with a solution of a powder of some other heavy metal compound or the like in an organic polymer binder. Usable lead compounds include $PbF_2$, $2PbCO_3$, $Pb(OH)_2$ and $Pb_3O_4$ and the like and usable bismuth compounds include $BiF_3$, $BiOCl$, $Bi_2(WO_4)_3$, $Bi_{12}SiO_{20}$, $Bi_{12}GeO_{20}$ and the like.

The spacers 4 are preferably made of a material that hardly absorbs X-rays. Usable materials meeting this description include, for example, polyethylene terephthalate, polycarbonate, polyurethane, filamentous polyester, acrylic resin, polyethylene, vinyl acetate, nylon, and rubbers such as natural rubber, silicone rubber and ethylene-vinyl acetate copolymer. Foamed polystyrene, polyurethane and the like are also usable. So are unwoven cloth and microfilter. Usable microfilter materials include nylon, cellulose acetate, polysulfone, fluorine-containing resins and the like.

The material used for the spacers 4 includes a thermoplastic resin (thermoplastic elastomer) so as to enable the original plate-like grid 1 to bow into an overall spherical shape under heating. Although the scattered ray absorbers 2 are inferior to the spacers 4 in flexibility, the lead compound or bismuth compound material thereof exhibits slight flexibility.

The top surface 6 of the scattered ray removal grid 1 shown in FIG. 1 is concave (a spherical surface) and the bottom surface 8 thereof is convex. The scattered ray absorbers 2 have narrower spacing on the upper side and wider spacing on the bottom side so as to be substantially aligned in the direction of the radiation (X-ray) source (not shown) located on the side of the top surface 6. In other words, where the X-ray source is defined as the focal point, the scattered ray absorbers 2 are aligned with the advancing direction of the rays radiating from the focal point (i.e., with the radial direction of a circle whose center is the focal point). With this alignment, the area over which a scattered ray absorber 2 blocks X-rays does not change (increase) with its location within the scattered ray removal grid 1, so that X-ray transmittance is maintained without decrease over a broad region of the scattered ray removal grid 1.

The method of producing the scattered ray removal grid 1 will now be explained with reference to FIGS. 2 to 5C. FIGS. 2, 3, 4A and 4B are perspective views respectively showing first, second, third, fourth and fifth steps and FIGS. 5A, 5B and 5C are sectional views respectively showing sixth, seventh and eighth steps in the production of a scattered ray removal grid 1 according to the present invention.

Figure 2:
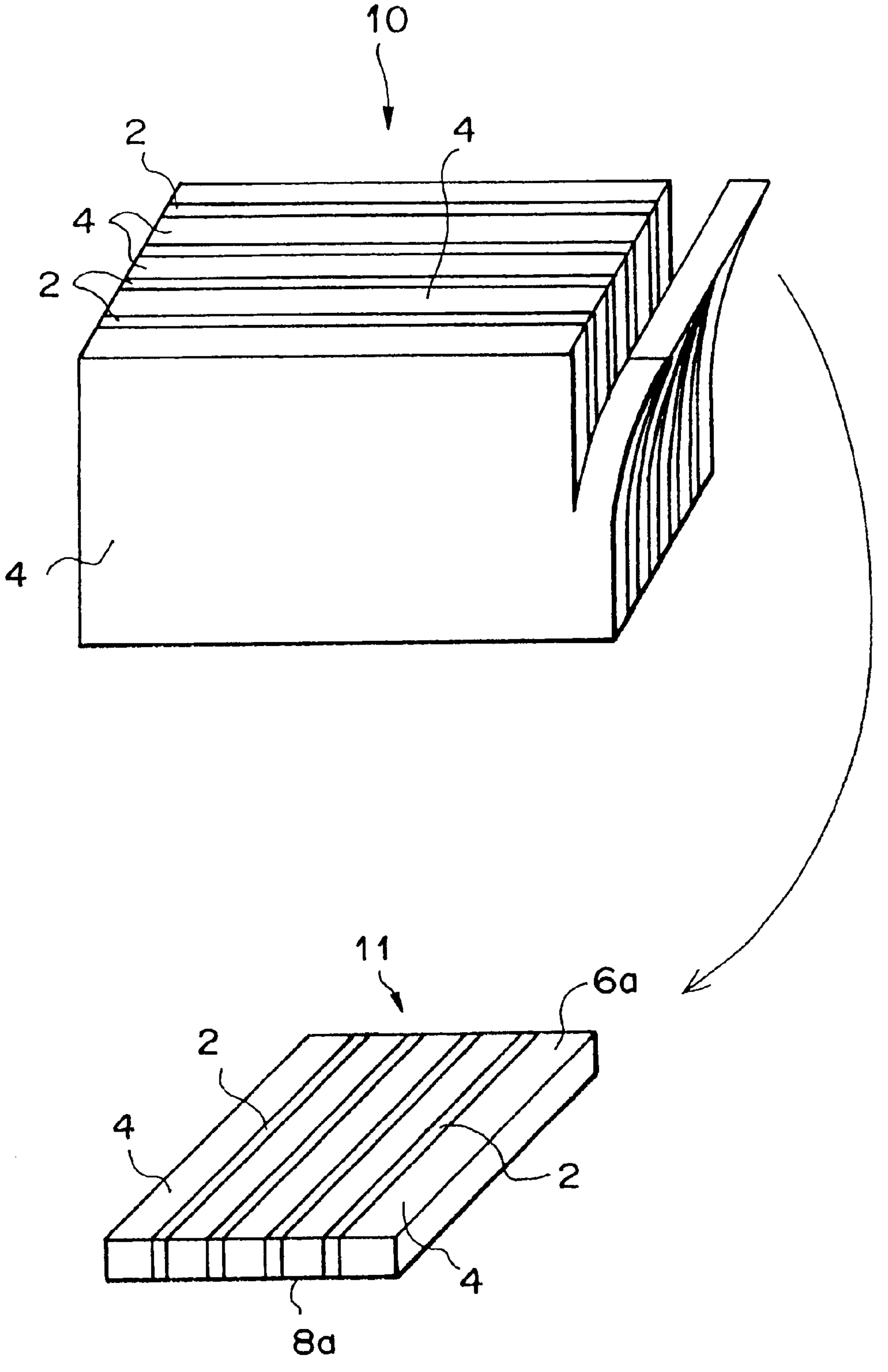
FIG. 2 is a perspective view of a laminate and a grid, indicating first and second steps in the production of a scattered ray removal grid according to the present invention.

Referring to FIG. 2, in the first step, a laminate (first laminate) 10 is made by alternately stacking and bonding scattered ray absorbers 2 and spacers 4. The bonding is effected by use of a bonding agent. Interposition of bonding film is also possible, as is bonding under application of pressure. Bonding conducted in a vacuum is preferable because it enhances the strength of the laminate by bringing the layers into tight contact and preventing occurrence of interlayer voids.

In the second step, also shown in FIG. 2, the end portion of the laminate 10 is sliced perpendicularly to its layers to separate a plate-like piece. By this there is obtained a grid (first grid) 11. The scattered ray absorbers 2 of the grid 11 lie parallel to one another.

Figure 3:
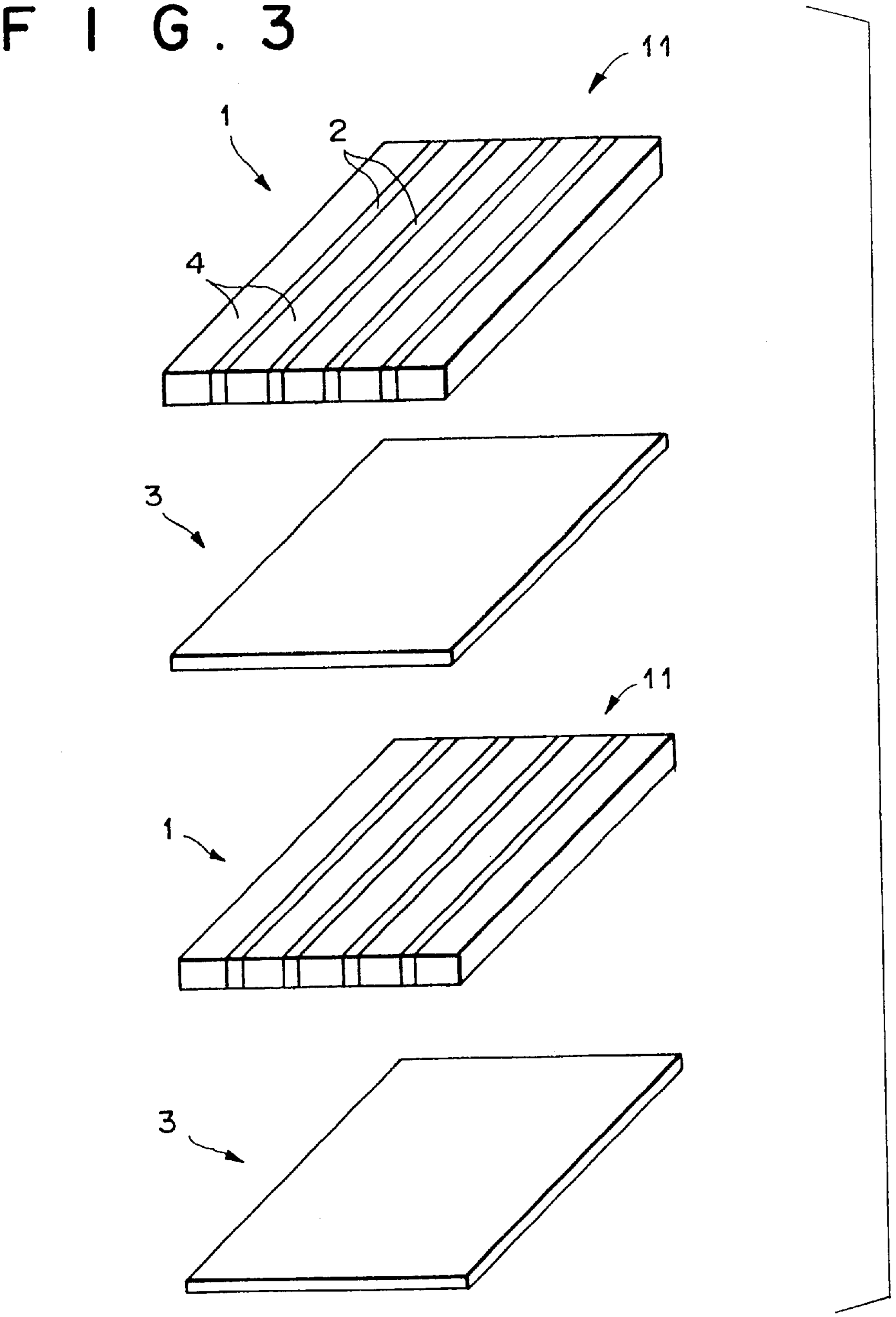
FIG. 3 is a perspective view of grids and radiation absorption plates, indicating a third step in the production of a scattered ray removal grid according to the present invention.

In the third step, shown in FIG. 3, grids 11 formed by slicing the laminate 10 shown in FIG. 2 and radiation absorption plates 3 made of a scattered ray-absorbing material are disposed alternately in preparation for lamination.

Figure 4A:
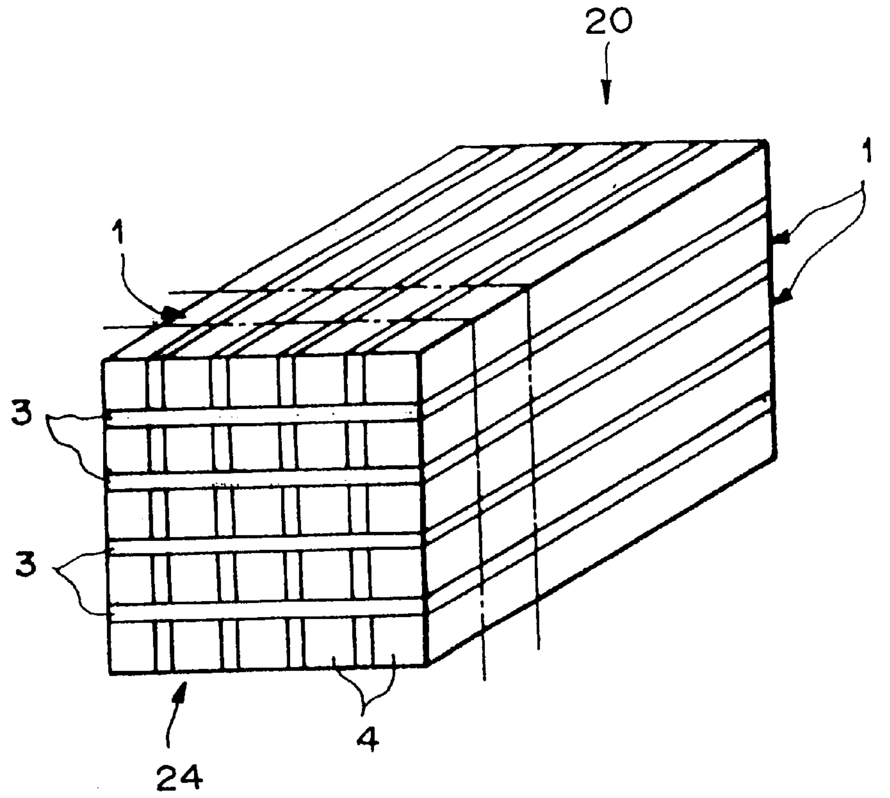
FIG. 4A is a perspective view showing a laminate formed in a fourth step in the production of a scattered ray removal grid according to the present invention.
Figure 5A:
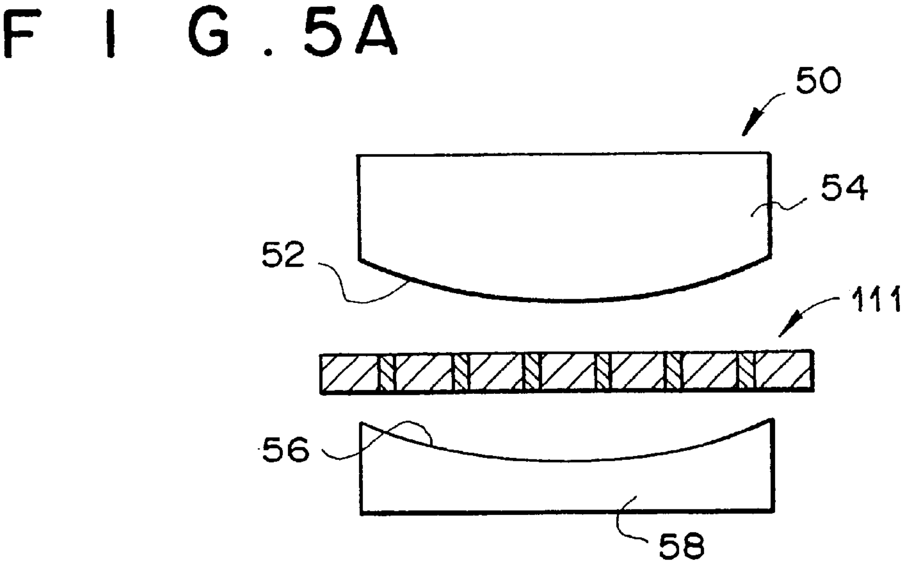
FIG. 5A is a sectional view showing a grid disposed between dies in a sixth step of grid formation.
Figure 5B:
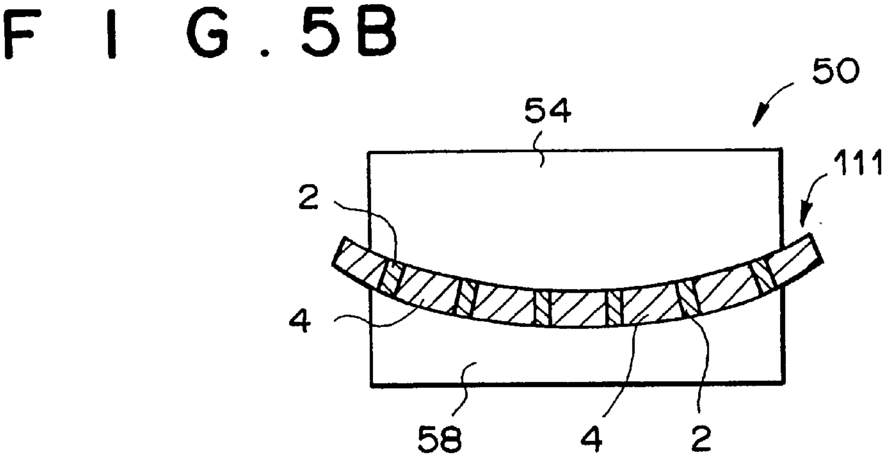
FIG. 5B is a sectional view showing the grid between the dies pressed into a bowed shape in a seventh step of grid formation.
Figure 5C:
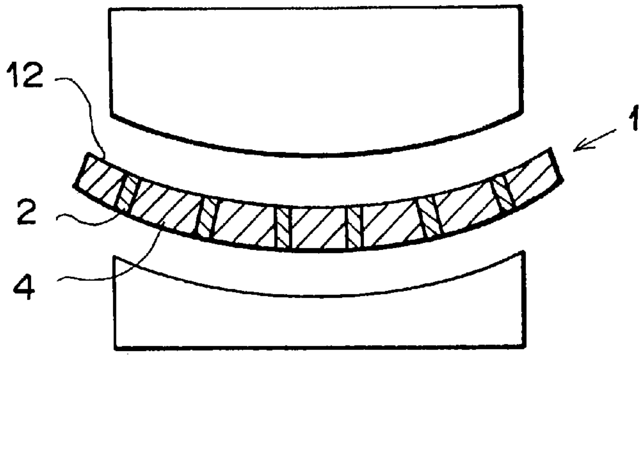
FIG. 5C is a sectional view showing the formed scattered ray removal grid along with the dies in an eighth step of grid formation.
Figure 6:
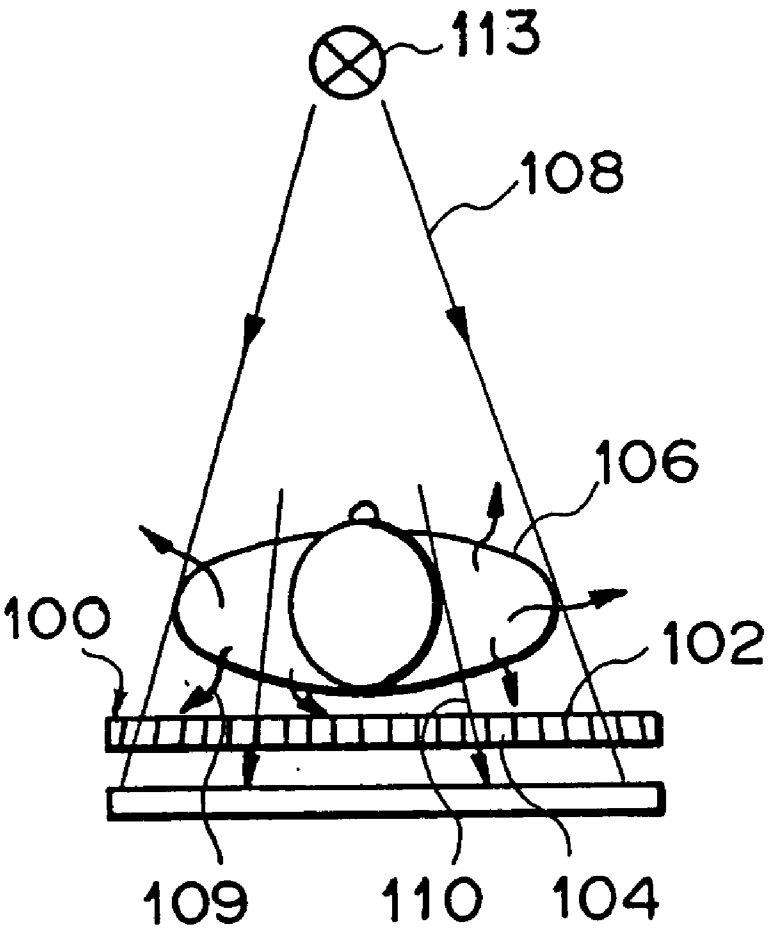
FIG. 6 PRIOR ART
FIG. 6 is a schematic sectional view of a conventional scattered ray removal grid.

In the fourth step, the grids 11 and the radiation absorption plates 3 are laminated to obtain a laminate (second laminate) 20 shown in FIG. 4A. At the end face 24 of the laminate 20, the scattered ray absorbers 2 and the radiation absorption plates 3 are arranged substantially in a lattice configuration and the spacers 4 are present within meshes of the lattice.

Figure 4B:
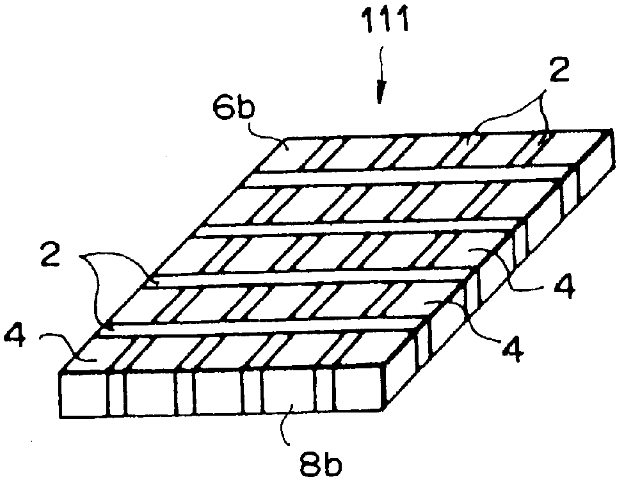
FIG. 4B is a perspective view showing a grid formed in a fifth step in the production of a scattered ray removal grid according to the present invention.

In the fifth step, plate-like slices are successively removed from the laminate 20 starting from near its end face 24, as indicated by broken lines, to obtain grids (second grids) 111 like the one shown in FIG. 4B. In the illustrated embodiment, the same type of material is used for the radiation absorption plates 3 as was used for the scattered ray absorbers 2 of the grid 11. This is to minimize the number of material types used. The invention is not limited to this, however, and different materials can be used insofar as they are similar in X-ray absorption property. The grid 111 uniformly removes scattered rays and exhibits substantially uniform flexibility. The top surface 6*b* and the bottom surface 8*b* of the grid 111 can be optionally attached with reinforcing plates (not shown) made of deformable thermoplastic resin. In this case, the reinforcing plate bonded to the bottom surface 8*b* must have greater elasticity.

The method of imparting a spherical surface of a prescribed radius of curvature to the plate-like grid 111, i.e., the method of forming a scattered ray removal grid 1 having a spherical surface 12, will now be explained with reference to FIGS. 5A–5C. FIG. 5A is a sectional view showing the grid 111 disposed between a pair of dies 50 made of aluminum, stainless steel or the like. FIG. 5B is a sectional view showing the grid 111 pressed into a spherical shape by the dies 50 and FIG. 5C is a sectional view showing the formed scattered ray removal grid 1 together with the dies 50.

FIG. 5A corresponds to the sixth step in the production of a scattered ray removal grid 1. The die pair 50 is constituted of an upper die 54 having a convex spherical surface 52 of prescribed curvature and a lower die 58 having a concave spherical surface 56 complementary to the spherical surface 52. The grid 111 is placed between the upper die 54 and the lower die 58.

In the seventh step, illustrated in FIG. 5B, the grid 111 is pressed from above and below by the upper die 54 and the lower die 58 while being simultaneously heated to the softening temperature of the spacers 4, whereby it softens and deforms into a spherical shape. The heating is achieved by, for example, passing hot water through the interiors of the dies 50. When the spacers 4 are not formed of a thermoplastic elastomer, the temperature of the dies 50 is raised to the melting point. When the grid softens, the spacers 4 (radiation non-absorbers made of thermoplastic resin) are deformed by the heat and pressure of the dies 50. The scattered ray absorbers 2 (radiation absorbers) are therefore inclined so as to be more narrowly spaced on the upper side than on the lower side. By this the radiation absorbers 2 are oriented into alignment with the advancing direction of the X-rays emitted by the X-ray source (not shown) and can therefore efficiently remove scattered rays.

In the eighth step, the dies 50 are moved apart and the formed grid 111 is taken out and cooled to normal room temperature to obtain a scattered ray removal grid 1 having a prescribed spherical surface 12, as shown in FIG. 5C.

A scattered ray removal grid according to the present invention can also be obtained by inserting the grid 11 of FIG. 2 between the dies 50 instead of the grid 111. In this case, there is obtained a grid having parallelly arrayed radiation absorbers 4. The top surface 6*a* and the bottom surface 8*a* of the grid 11 can be provided with reinforcing plates (not shown).

What is claimed is:

1. A method of producing a scattered ray removal grid comprising:

forming a substantially flat-shaped grid having thermoplastic resin interposed between grid elements and placing the grid between a set of dies having surfaces of complementary spherical curvature of prescribed radii, causing the set of dies to form the grid into a shape having spherical curvature of a prescribed radius by pressing and heating the grid to its softening temperature, and cooling the grid formed in a spherical shape, wherein the step of forming the substantially flat-shaped grid includes:

forming a laminate by alternately stacking and bonding layers of scattered ray absorbers and spacers;

slicing an end portion of the laminate perpendicularly to a stacked direction of the layers so that the scattered ray absorbers lie parallel to one another;

forming a second laminate by alternately layering the sliced end portions of the laminate with radiation absorption plates to form a lattice structure; and slicing an end portion of the second laminate perpendicularly to a stacked direction of the layers to form the substantially flat-shaped grid.

* * * * *